Sept. 21, 1965 J. R. GLASS ETAL 3,207,585
ANALYSIS BY QUANTITATIVE COMBUSTION
Filed July 20, 1962 2 Sheets-Sheet 1

INVENTORS
John R. Glass
David Liederman
By Oswald G. Hayer
Attorney

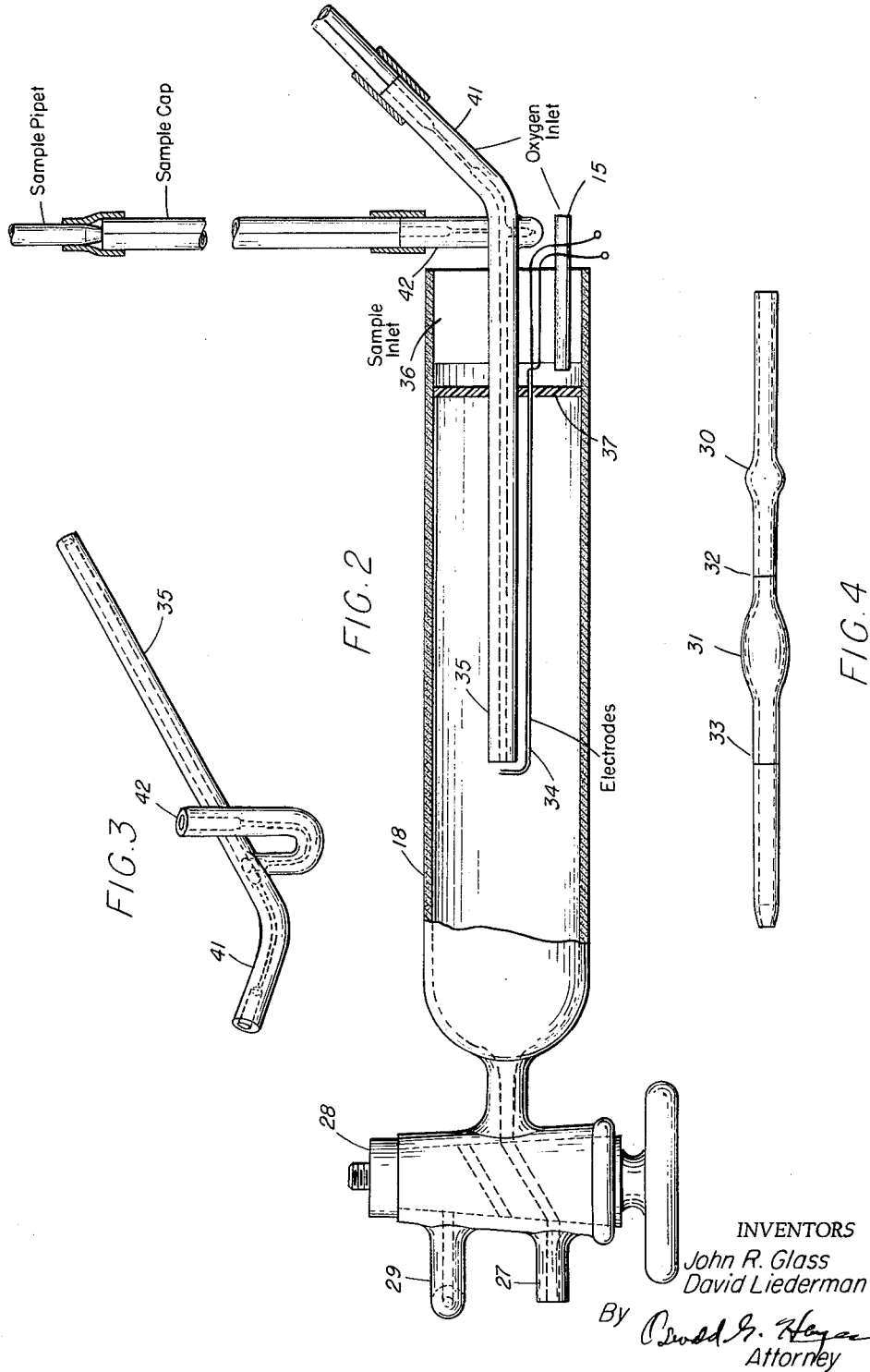

United States Patent Office 3,207,585
Patented Sept. 21, 1965

3,207,585
ANALYSIS BY QUANTITATIVE COMBUSTION
John R. Glass, Glassboro, and David Liederman, Audubon, N.J., assignors to Socony Mobil Oil Company, Inc., a corporation of New York
Filed July 20, 1962, Ser. No. 211,297
6 Claims. (Cl. 23—232)

This invention relates to the analysis of combustible materials. More particularly, it pertains to a device for completely burning a measured amount of a substance and analyzing the combustion products.

There are presently many schemes and devices for determining the molecular composition of a substance by combustion analysis. A major problem common to almost all of these devices is the limited range of materials which may be tested for, e.g., only non-aromatics, or only those substances of low to medium molecular weight. Another shortcoming of these earlier devices has been the need to measure out the sample beforehand. This is a time consuming operation. Furthermore, by measuring the sample ahead of time the test must include the periods of start-up and shut-down, when the flame is not burning steadily and combustion may be incomplete.

This invention will provide a device for quickly and simply analyzing organic material by combustion analysis. It is a further object to provide means for burning any type of organic material completely regardless of chemical type. This invention will eliminate the need for preliminary measuring of the sample. Another object is to provide a device wherein the burning sample is allowed to reach steady-state before the analysis is begun.

Generally, the device of this invention comprises fuel burning means, fuel supply means to supply fuel to said burning means, gas supply means to supply combustion-supporting medium to said burning means, collecting means to collect a key combustion product from said burning means for analysis, and the combination of means to indicate the passage through said fuel supply means of a predetermined quantity of fuel and means to selectively pass combustion products to said collecting means.

FIG. 2 is a plan view of a specific embodiment of the combustion chamber;

FIG. 3 is an isometric drawing of a specific embodiment of the combustion torch;

FIG. 4 is an elevation view of a specific embodiment of the volumetric sample holder.

Figure 1:
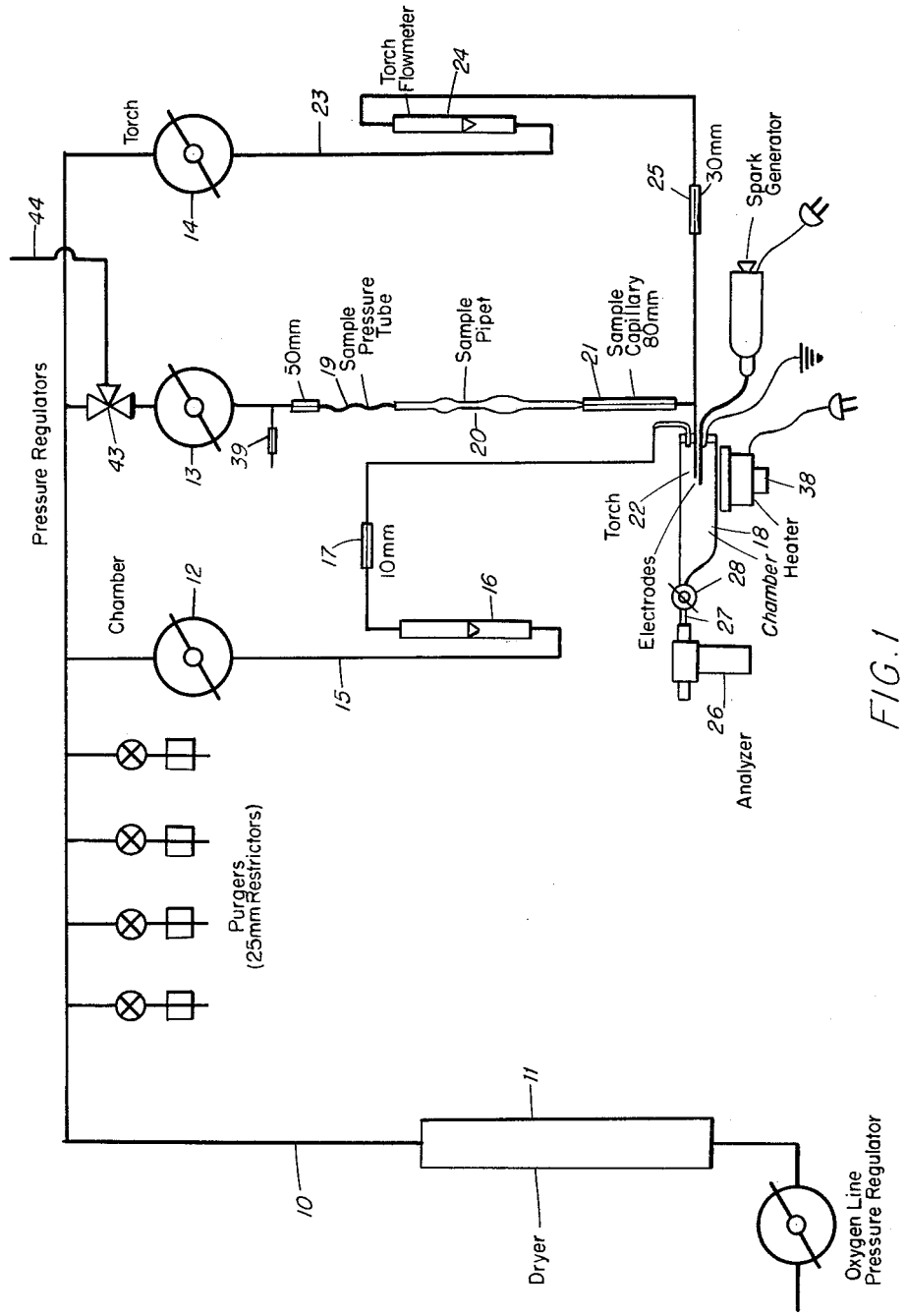
FIGURE 1 is a diagram of a specific embodiment of the combustion analysis system.

Referring now to FIG. 1, pressure regulators 12, 13 and 14 are attached in parallel to oxygen line 10, which runs from a source of oxygen under pressure, not shown, and through dryer 11. Attached in series between regulator 12 and the combustion chamber 18 is line 15, flow meter 16 and flow restrictor 17, and between regulator 14 and the torch 22 is line 23, flow meter 24 and flow restrictor 25. The various flow restrictors serve to smooth out, and help in the regulation of, the fluid flow. They are formed from short lengths of .003 inch I.D. capillary tubing.

Sample pressure tube 19 connects the regulator 13 with the sample holder pipet 20. A length of .003 inch capillary tubing 21 connects the pipet 20 with torch 22. Bleed line 39 comprising a length of .003 inch capillary tubing is attached in parallel with the pressure tube 19 to regulator 13.

It may be necessary at times to use an inert gas as the pressuring fluid for the sample. Three-way stopcock 43, or other valve means, is attached between regulator 13 and line 10, and is also attached to line 44 which may be connected to a source of inert gas, under pressure, such as nitrogen.

Combustion chamber 18 may be connected to analyzer 26 through three-way stopcock 28 and line 27 (as shown in FIG. 2). A second position of the stopcock closes off the analyzer and opens the chamber to the atmosphere through line 29. Heater 38 is located adjacent to chamber 18.

In FIG. 2 the combustion chamber has been rotated 90° relative to the torch so as to show the details of the stopcock. FIG. 2 illustrates an arrangement of the igniter electrodes 34, oxygen inlet 15, and the nozzle 35 of torch 22 within the chamber 18 and through stopper 36. The nozzle 35 and electrodes 34 pass through a ⅛ inch Teflon disc 37, the same diameter as the chamber. The disc 37 is notched around its circumference to allow the oxygen to enter the chamber. Electrodes 34 are so placed that the spark jumping the gap between them passes right in front of nozzle 35.

Three-way stopcock 28, or any other valve means, is located at the opposite end of the chamber and is attached off-center to the top of the chamber to prevent the passage of solid carbon particles.

Referring to FIG. 3, the torch 22 is formed from lengths of 1 mm. I.D. quartz capillary tubing. To prevent flame flash back during start-up and shut-down, the internal diameters of oxygen inlet 41 and sample inlet 42 are reduced to about 0.2 mm. along a portion of their respective lengths and the bore volume at the T-joint is kept as small as possible. To help steady the flame, the tip of the flame-holding nozzle 35 is necked down to an internal diameter of about 0.5 mm. The nozzle 35 must be long enough to allow the sample to vaporize and mix with the oxygen.

Referring to FIG. 4, the sample holder pipet 20 has a small bulb 30 of about 0.5 ml. capacity, and a larger bulb 31 about 1.5 ml. capacity accurately measured between etched lines 32 and 33.

Chamber 18 is preferably made from quartz tubing. Other transparent materials which may be used are "Pyrex" and "Vycor." Opaque ceramics, such as "Alundum" and Zircofax," may be used with windows of quartz or the other transparent materials for viewing the flame. The transparency of quartz or glass is of course an advantage. The torch 22 may also be made of any of the above named materials, except for the lower-melting glass materials, or of platinum.

The analyzer-absorber system 26 may be any of a large number of known types of gas analyzing systems, depending on the substance to be analyzed for and the degree of accuracy required.

In the following example, the hydrogen content of a petroleum reformate was determined. For this case, the analyzer system consisted of an absorber containing a desiccant, such as magnesium perchlorate, which will absorb the water resulting from the combustion of the sample of reformate. The change in weight of the absorber during the test run is equal to the amount of water formed from the combustion of the sample.

The absorber is first equilibrated and weighed before being attached to the chamber 18. Stopcock 28 is set so that the chamber is open to the atomsphere and the absorber is closed off. Heater 38 is turned on and the pressure regulators 12 and 14 are adjusted to allow oxygen to flow into the chamber 18 and through the torch 22. After the chamber 18 has been heated to above the dew point of the combustion gases, which may be determined by experience, the sparking electrodes 34 are energized and the sample holder 20 is filled with reformate sample at room temperature to a point above the smaller bulb 30 and placed in position as shown in FIG. 1. The regulator 13 is adjusted to force the sample to flow to the torch 22. Regulators 14 and 13 should be adjusted until the flame is burning steadily and smokelessly. Then the electrodes may be de-energized.

The operator must turn the stopcock 28 to the position opening the absorber to the chamber 18 as soon as the meniscus of the sample in the holder 20 crosses the first etched line 32; this is the start of the test run. When the larger bulb 31 has been emptied and the meniscus crosses the second etched line 33, the stopcock should be simultaneously turned to close off the absorber and open the chamber to the atmosphere: the flame may then be extinguished. The absorber is then purged with oxygen and allowed to slowly cool to room conditions before it is weighed.

The burning of the sample requires about 15 minutes. Although each analysis may take as much as an hour, the operator can run 12 to 15 analyses per 8-hour shift.

The following formula is used to compute the concentration of hydrogen in the sample:

$$\text{Percent H} = \frac{11.19\,(W_F - W_I)}{DV}$$

where $W_F$ = final weight of absorber
$W_I$ = initial weight of absorber
$V$ = volume of sample burned
$D$ = density of sample at room temperature Table I below shows the results of several runs, and compares it with the beta-ray method of determination which requires far most costly apparatus and extensive preliminary calibration.

TABLE I

*Results of typical samples*

| Sample No. | Description | Percent Hydrogen | |
|---|---|---|---|
| | | Beta-ray | Burner Method |
| 1 | Reformate | 11.68, 11.66 | 11.69, 11.68 |
| 2 | do | 10.14, 10.19 | 10.16, 10.18 |
| 3 | do | 11.94, 11.93 | 11.93, 11.92 |
| 4 | do | 10.88, 10.88 | 10.83, 10.84 |
| 5 | do | 9.66, 9.69 | 9.67, 9.66 |
| 6 | do | 11.67, 11.67 | 11.67, 11.62 |
| | Standard Deviation | 0.028 | 0.025 |

The beta-ray instrument used in making the determinations in Table I, above, was constructed according to the disclosure in U.S. 2,757,290 to Jacobs et al., July 31, 1956. The method of calibration and use in discussed in Anal. Chem. 28, 324 (56) and Anal. Chem. 31, 558 (59).

As may be seen from the above table, the burner method is at least as precise as the beta-ray method it was compared with.

The ease and speed with which this analytical method is carried out was well illustrated by the above example. The reasonable cost of the apparatus allows it to be installed at any manufacturing site at which it may be needed, and its ease of operation makes it well suited to be used by the operators in charge of a processing unit, rather than requiring the attention of a trained laboratory analyst.

An extension of the example given above would be to use the device at refinery locations to determine the hydrogen balance around the reformer unit. By determining the hydrogen percentage in the reformate and the charge stock by this method, and knowing how much elemental hydrogen is added, the operator is able to calculate the optimum conditions for operation and thus increase the efficiency of the unit. The simplicity and inexpensiveness of the apparatus allows it to be installed at every unit and thus enables the operator to make a check at least once a day.

This apparatus may be used for other refinery operations to determine the carbon, sulfur, or nitrogen content of a stream as well as the hydrogen content. End-product streams in any organic chemical plants are also likely places to use this device.

When analyzing extremely viscous materials, such as crude oil or residual stock, or solid materials, such as waxes, it may be necessary to dissolve the sample in a solvent of known composition. In the instances where only one component, such as hydrogen, is being analyzed for, it would be possible to select a solvent which does not contain that component, such as carbon disulfide in the case of hydrogen. In other cases, it is a simple matter to compensate in the calculations for the hydrogen introduced by the solvent.

The specific embodiments described above are merely exemplary of the general idea of the invention and they should not be construed as restricting the scope and breadth of the invention as it is set out in the claims below.

What is claimed is:

1. A method for determining the concentration of a specific combustible component in a liquid, comprising continuously conducting a combustion supporting gas through a conduit to a combustion zone, adding said liquid to said conduit at a point sufficiently upstream from the combustion zone to allow said liquid to vaporize and mix with said combustion supporting gas, separately supplying a combustion supporting gas to said combustion zone, igniting said stream in said combustion zone, discharging the combustion products from said combustion zone as they are produced, correlating the flow of said stream of liquid and the flow of said combustion supporting gas added to said stream until substantially complete combustion of said liquid in said combustion zone is attained, and while said substantially complete combustion is maintained in said combustion zone, diverting combustion products from said combustion zone to a collection zone containing collection medium that collects from said combustion products the combustion products of said combustible component, and when a measured amount of liquid has passed into the combustion zone following diversion of combustion products to said collection zone, diverting the combustion products from passage into the collection zone, measuring the amount of the combustion product of said combustible component collected from said combustion products in said collection zone during the interval starting with diversion of combustion products to the collection zone and ending with diversion of combustion products from passage into the collection zone, and calculating the amount of said combustible component contained in said measured amount of the combustion product of said combustible component.

2. A method for determining the concentration of hydrogen in an organic liquid, comprising continuously conducting a free-oxygen-containing gas through a conduit to a combustion zone, adding said liquid to said conduit at a point sufficiently upstream from the combustion zone to allow said liquid to vaporize and mix with said free-oxygen-containing gas, separately supplying a free-oxygen-containing gas to said combustion zone, igniting said stream in said combustion zone, discharging the combustion products from said combustion zone as they are produced, correlating the flow of said stream of liquid and the flow of oxygen added to said stream until substantially complete combustion of said liquid in said combustion zone is attained, and while said substantially complete combustion is maintained in said combustion zone, diverting combustion products from said combustion zone to an absorption zone containing a desiccant that absorbs the water in said combustion products, and when a measured amount of liquid has passed into the combustion zone following diversion of combustion products to said absorption zone, diverting the combustion products from passage into the absorption zone, measuring the amount of water absorbed from said combustion products in said absorption zone during the interval starting with diversion of combustion products to the absorption zone and ending with diversion of combustion products from passage into the absorption zone, and calculating the amount of hydrogen contained in said measured amount of water.

3. A method, as defined in claim 2, in which said organic liquid comprises a petroleum reformate.

4. Apparatus for determining the concentration of a specific combustible component in a liquid, comprising a closed combustion chamber, a first confined conduit ending in a nozzle disposed in said chamber, said nozzle being adapted to hold a flame, means for passing a stream of combustion-supporting gas through said first conduit into said chamber, a second confined conduit connected to said first conduit at a point sufficiently upstream from said nozzle to provide for said liquid to vaporize and mix with said combustion supporting gas prior to said chamber, inlet means in said chamber separate from said first conduit for admitting a combustion-supporting gas into said chamber, means for igniting combustibles exiting from said nozzle, a third confined conduit connected to said chamber for conducting combustion products from said chamber as they are produced, means for regulating the flow of said combustion-supporting gas through said first conduit and means for regulating the flow of said liquid through said second conduit to pass through said nozzle a mixture of said combustion-supporting gas and of said liquid conducive to continuous substantially complete combustion of said liquid at said nozzle, collection means associated with said third conduit and adapted to selectively collect from said combustion products the combustion product of said combustible component, and valve means disposed in said third conduit between said chamber and said collection means for directing said combustion products to said collection means while said substantially complete combustion is maintained at said nozzle and a measured amount of said liquid is conducted through said second conduit, and for diverting said combustion products from said collection means before and after said measured amount of liquid is conducted through said second conduit.

5. Apparatus for determining the concentration of hydrogen in an organic liquid, comprising a closed combustion chamber, a first confined conduit ending in a nozzle disposed in said chamber, said nozzle being adapted to hold a flame, means for passing a stream of free-oxygen-containing gas through said first conduit into said chamber, a second confined conduit connected to said first conduit at a point sufficiently upstream from said nozzle to provide for said liquid to vaporize and mix with said free-oxygen-containing gas prior to said chamber, inlet means in said chamber separate from said first conduit for admitting a free-oxygen-containing gas into said chamber, means for igniting combustibles exiting from said nozzle, a third confined conduit connected to said chamber for conducting combustion products from said chamber as they are produced, meeans for regulating the flow of said free-oxygen-containing gas through said first conduit and means for regulating the flow of said liquid through said second conduit to pass through said nozzle a mixture of said free-oxygen-containing gas and of said liquid conducive to continuous substantially complete combustion of said liquid at said nozzle, absorption means associated with said third conduit and adapted to selectively absorb the water from said combustion products, and valve means disposed in said third conduit between said chamber and said absorption means for directing said combustion products to said absorption means while said substantially complete combustion is maintained at said nozzle and a measured amount of said liquid is conducted through said second conduit, and for diverting said combustion products from said absorption means before and after said measured amount of liquid is conducted through said second conduit.

6. Apparatus, as defined in claim 4, further comprising heating means adjacent said combustion chamber for maintaining the temperature of said chamber above the dew point of said combustion products produced in said chamber.

References Cited by the Examiner

UNITED STATES PATENTS

| 1,382,072 | 6/21 | Finkl | 23—254 X |
| 2,962,360 | 11/60 | Bennet et al. | 23—256 X |
| 3,027,241 | 3/62 | Andreatch et al. | |

FOREIGN PATENTS

| 1,006,182 | 4/57 | Germany. |
| 1,032,000 | 6/58 | Germany. |

OTHER REFERENCES

Renoll et al.: "Anal. Chem." 9, 556, 567 (1937).

MORRIS O. WOLK, *Primary Examiner.*